(12) United States Patent
Taherzadeh Boroujeni et al.

(10) Patent No.: US 12,082,180 B2
(45) Date of Patent: Sep. 3, 2024

(54) RESOURCE IDENTIFICATION FOR UPLINK SCHEDULED TRANSMISSION AFTER CANCELLATION INDICATION RECEIPT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/302,335

(22) Filed: Apr. 30, 2021

(65) Prior Publication Data
US 2021/0352678 A1    Nov. 11, 2021

Related U.S. Application Data

(60) Provisional application No. 63/021,453, filed on May 7, 2020.

(51) Int. Cl.
*H04W 72/121*    (2023.01)
*H04L 5/00*    (2006.01)
(Continued)

(52) U.S. Cl.
CPC ......... *H04W 72/121* (2013.01); *H04L 5/0098* (2013.01); *H04W 72/1268* (2013.01); *H04W 72/23* (2023.01)

(58) Field of Classification Search
None
See application file for complete search history.

(56) References Cited

U.S. PATENT DOCUMENTS 11,140,575 B2    10/2021    Rico et al.
2019/0150172 A1    5/2019    Ang et al.
(Continued)

FOREIGN PATENT DOCUMENTS

CN    110892775 A    3/2020
WO    2019032954    2/2019

OTHER PUBLICATIONS

Qualcomm, "Remaining issues on uplink inter-UE Tx multiplexing and prioritization", 3GPP TSG RAN WG1 #100b eMeeting, Apr. 20-30, 2020, R1-2002548, Total 6 Pages. (Year: 2020).*

(Continued)

*Primary Examiner* — Liem H. Nguyen
(74) *Attorney, Agent, or Firm* — Harrity & Harrity, LLP (57) ABSTRACT

Various aspects of the present disclosure generally relate to wireless communication. In some aspects, a user equipment may receive a cancellation indication, to drop one or more scheduled uplink communications associated with a first one or more scheduled uplink resources, in a group-common downlink control information message of a downlink control channel communication; identify, based at least in part on the cancellation indication, a second one or more scheduled uplink resources for a particular uplink communication; and (Continued)

transmit the particular uplink communication using the second one or more scheduled uplink resources. Numerous other aspects are provided.

30 Claims, 6 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 2019/0281487 A1 | 9/2019 | Liu et al. | |
| 2019/0306848 A1* | 10/2019 | Zhou | H04W 72/54 |
| 2020/0229202 A1* | 7/2020 | Bagheri | H04L 25/0226 |
| 2020/0305183 A1* | 9/2020 | Papasakellariou | H04W 72/1284 |
| 2021/0203397 A1* | 7/2021 | Xiong | H04W 72/046 |
| 2021/0204358 A1* | 7/2021 | Babaei | H04W 76/11 |
| 2022/0150928 A1* | 5/2022 | Choi | H04W 72/1268 |
| 2022/0182990 A1* | 6/2022 | Liu | H04L 5/0094 |
| 2022/0210793 A1* | 6/2022 | Behravan | H04W 12/106 |
| 2022/0217736 A1* | 7/2022 | Taherzadeh Boroujeni | H04L 5/0094 |
| 2022/0217750 A1* | 7/2022 | Liu | H04L 5/003 |
| 2022/0272714 A1* | 8/2022 | Bagheri | H04W 72/14 |
| 2022/0272739 A1* | 8/2022 | Takahashi | H04W 72/23 |
| 2022/0312469 A1* | 9/2022 | Choi | H04W 72/1268 |
| 2022/0322250 A1* | 10/2022 | Zhou | H04W 72/0473 |
| 2022/0353887 A1* | 11/2022 | Xu | H04W 72/1268 |
| 2022/0386355 A1* | 12/2022 | Yi | H04W 72/569 |
| 2023/0029903 A1* | 2/2023 | Singh | H04W 72/1268 |

OTHER PUBLICATIONS

International Search Report and Written Opinion—PCT/US2021/030471—ISA/EPO—dated Sep. 1, 2021.

NTT Docomo, Inc., "UL Inter-UE Transmission Prioritization/Multiplexing", 3GPP Draft, 3GPP TSG RAN WG1 #98bis, R1-1911179, 3rd Generation Partnership Project (3GPP), Mobile Competence Centre, 650, Route Des Lucioles, F-06921 Sophia-Antipolis Cedex, France, vol. RAN WG1, No. Chongqing, China, 20191014-20191020, Oct. 7, 2019 (Oct. 7, 2019), XP051809018, 6 Pages, Retrieved from the Internet: URL: https://ftp.3gpp.org/tsg_ran/WG1_RL1/TSGR1_98b/Docs/R1-1911179.zip. R1-1911179.doc. [Retrieved on Oct. 7, 2019] pp. 5.6.

VIVO: "Summary#4 of UL Inter UE Tx Prioritization/Multiplexing", 3GPP Draft, 3GPP TSG RAN WG1 #98bis, R1-1911712, Summary #3 of UL InterUE TX PrioritizationMultiplexing_V4, 3rd Generation Partnership Project (3GPP), Mobile Competence Centre, 650, Route Des Lucioles, F-06921 Sophia-Antipoli, vol. RAN WG1, No. Chongqing, China, 20191014-20191020, Oct. 22, 2019 (Oct. 22, 2019), XP051798954, 39 Pages, Retrieved from the Internet: URL: https://ftp.3gpp.org/tsg_ran/WG1_RL1/TSGR1_98b/Docs/R1-1911712.zip R1-1911712 Summary#3 of UL interUE Tx prioritizationmultiplexing_v4.docx [Retrieved on Oct. 22, 2019], Section "2.1.3 Indication of time/frequency resource for UL cancelation". p. 9. sub-section "Time and frequency region". and p. 10. sub-section "Indication of time and frequency resource for cancelation (Potential RRC impact)" Section 2.2.2 Section "2.3 Support of alternative UL CI design" the whole document.

* cited by examiner

RESOURCE IDENTIFICATION FOR UPLINK SCHEDULED TRANSMISSION AFTER CANCELLATION INDICATION RECEIPT

CROSS-REFERENCE TO RELATED APPLICATION

This Patent application claims priority to U.S. Provisional Patent Application No. 63/021,453, filed on May 7, 2020, entitled "RESOURCE IDENTIFICATION FOR UPLINK SCHEDULED TRANSMISSION AFTER CANCELLATION INDICATION RECEIPT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for resource identification after cancellation indication receipt.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving a cancellation indication, to drop one or more scheduled uplink communications associated with a first one or more scheduled uplink resources, in a group-common downlink control information message of a downlink control channel communication; identifying, based at least in part on the cancellation indication, a second one or more scheduled uplink resources for a particular uplink communication; and transmitting the particular uplink communication using the second one or more scheduled uplink resources.

In some aspects, a user equipment for wireless communication may include a memory and one or more processors operatively coupled to the memory. The memory and the one or more processors may be configured to receive a cancellation indication, to drop one or more scheduled uplink communications associated with a first one or more scheduled uplink resources, in a group-common downlink control information message of a downlink control channel communication; identify, based at least in part on the cancellation indication, a second one or more scheduled uplink resources for a particular uplink communication; and transmit the particular uplink communication using the second one or more scheduled uplink resources.

In some aspects, a non-transitory computer-readable medium may store one or more instructions for wireless communication. The one or more instructions, when executed by one or more processors of a user equipment, may cause the one or more processors to receive a cancellation indication, to drop one or more scheduled uplink communications associated with a first one or more scheduled uplink resources, in a group-common downlink control information message of a downlink control channel communication; identify, based at least in part on the cancellation indication, a second one or more scheduled uplink resources for a particular uplink communication; and transmit the particular uplink communication using the second one or more scheduled uplink resources.

In some aspects, an apparatus for wireless communication may include means for receiving a cancellation indication, to drop one or more scheduled uplink communications associated with a first one or more scheduled uplink resources, in a group-common downlink control information message of a downlink control channel communication; means for identifying, based at least in part on the cancellation indication, a second one or more scheduled uplink resources for a particular uplink communication; and means for transmitting the particular uplink communication using the second one or more scheduled uplink resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
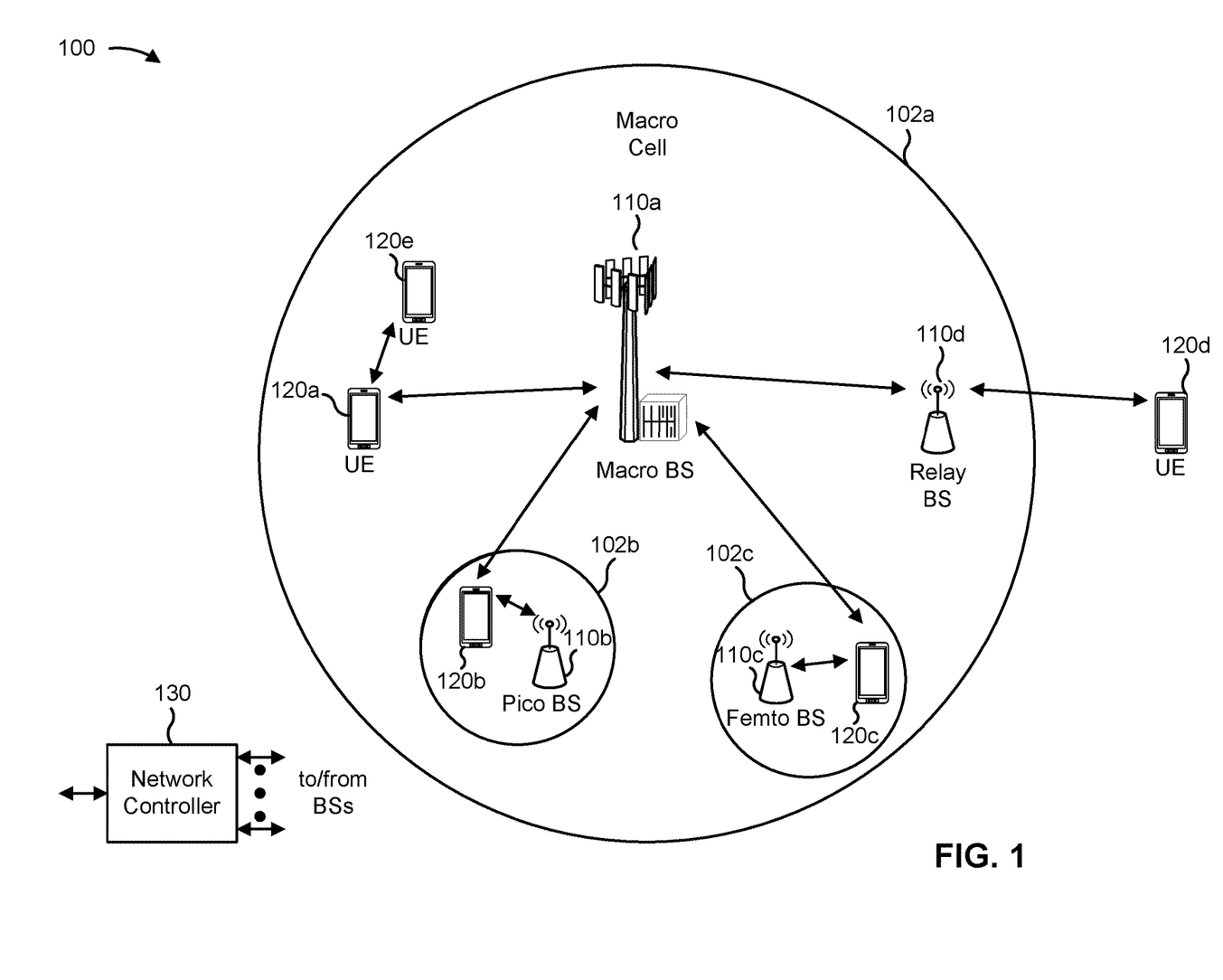
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations (BSs) 110 (shown as BS 110a, BS 110b, BS 110c, and BS 110d) and other network entities. A base station (BS) is an entity that communicates with user equipment (UEs) and may also be referred to as an "NR BS", "a Node B", "a gNB", a "5G node B (NB)", "an access point", or a "transmit receive point (TRP)", among other examples. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the BS 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
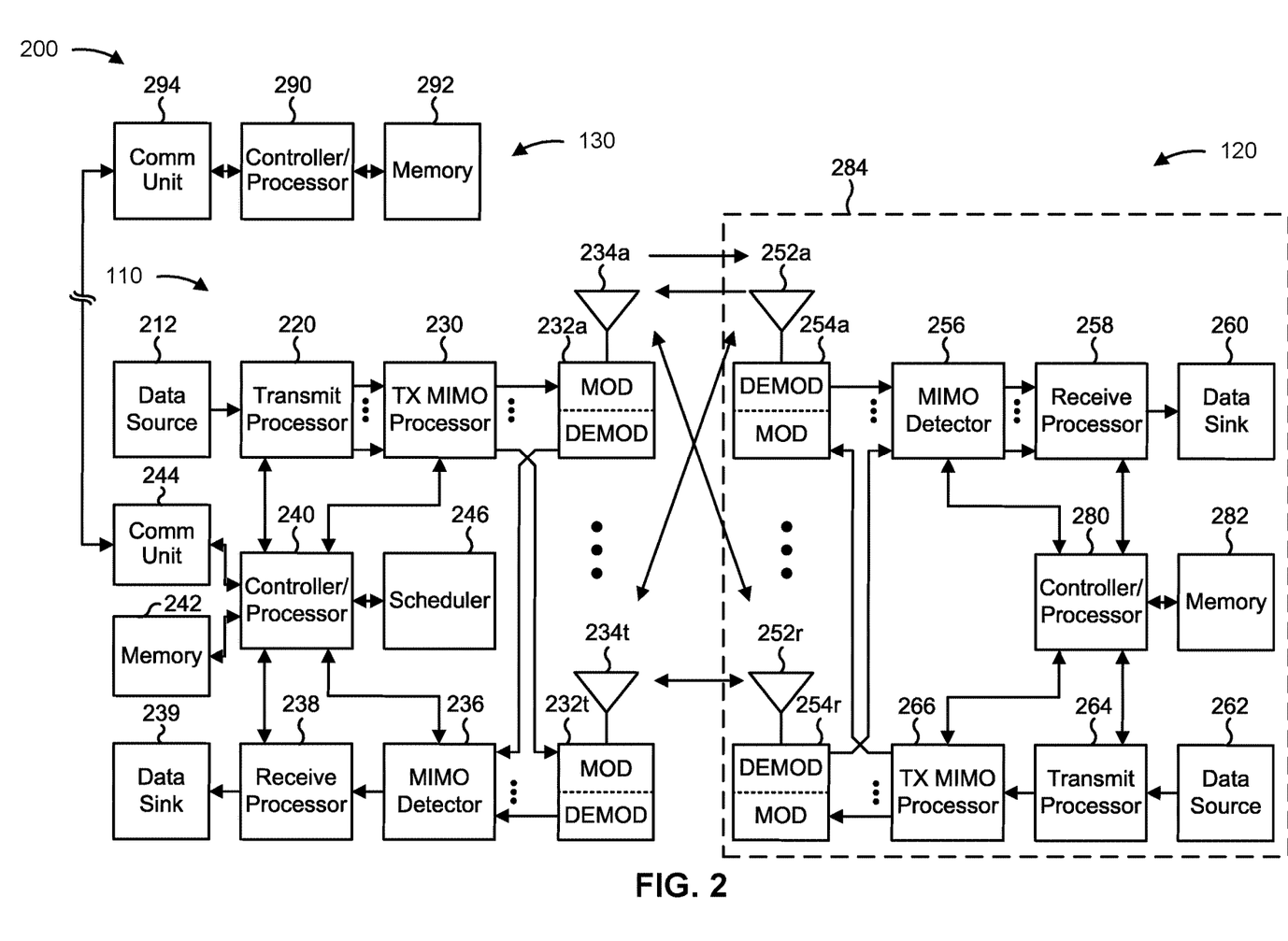
FIG. 2 is a diagram illustrating an example of a base station in communication with a UE in a wireless network, in accordance with the present disclosure.

FIG. 2 is a diagram illustrating an example 200 of a BS 110 in communication with a UE 120 in a wireless network 100, in accordance with the present disclosure. BS 110 may be equipped with T antennas 234a through 234t, and UE 120 may be equipped with R antennas 252a through 252r, wherein in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with BS 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to BS 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-5.

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. BS 110 may include a scheduler 246 to schedule UEs 120 for downlink and/or uplink communications. In some aspects, a modulator and a demodulator (e.g., MOD/DEMOD 232) of the BS 110 may be included in a modem of the BS 110. In some aspects, the BS 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/ processor 240) and memory 242 to perform aspects of any of the methods described herein, for example, as described with reference to FIGS. 4-5.

Controller/processor 240 of BS 110, controller/processor 280 of UE 120, and/or any other component(s) of FIG. 2 may perform one or more techniques associated with resource identification after cancellation indication receipt, as described in more detail elsewhere herein. For example, controller/processor 240 of BS 110, controller/processor 280 of UE 120, and/or any other component(s) of FIG. 2 may perform or direct operations of, for example, process 500 of FIG. 5 and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the BS 110 and/or the UE 120, may cause the one or more processors, the UE 120, and/or the BS 110 to perform or direct operations of, for example, process 500 of FIG. 5 and/or other processes as described herein. In some aspects, executing instructions may include running the instructions, converting the instructions, compiling the instructions, and/or interpreting the instructions, among other examples.

In some aspects, UE 120 may include means for receiving a cancellation indication, to drop one or more scheduled uplink communications associated with a first one or more scheduled uplink resources, in a group-common downlink control information message of a downlink control channel communication, means for identifying, based at least in part on the cancellation indication, a second one or more scheduled uplink resources for a particular uplink communication, means for transmitting the particular uplink communication using the second one or more scheduled uplink resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
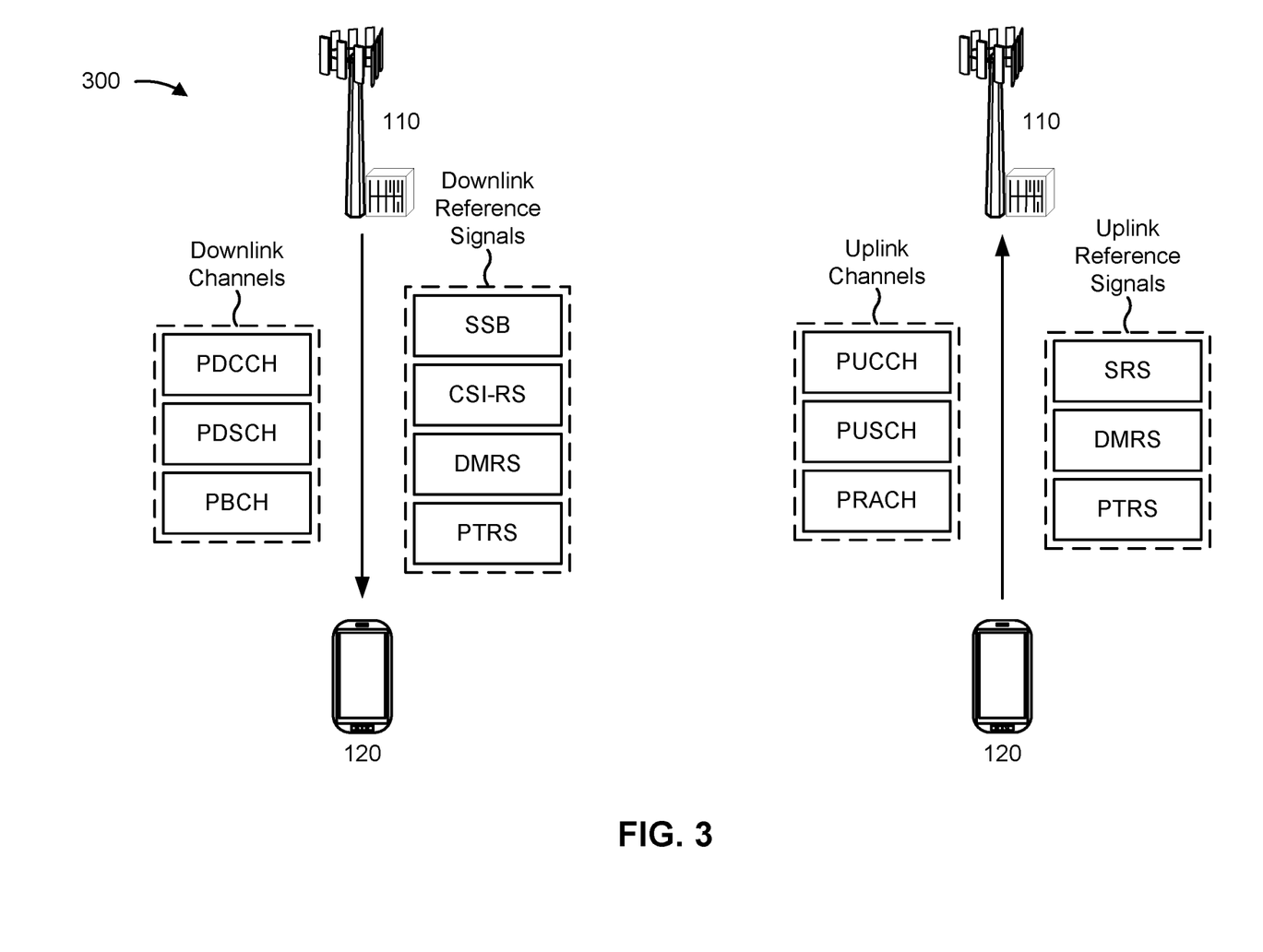
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a BS 110 to a UE 120, and uplink channels and uplink reference signals may carry information from a UE 120 to a BS 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the BS 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The BS 110 may configure a set of CSI-RSs for the UE 120, and the UE 120 may measure the configured set of CSI-RSs. Based at least in part on the measurements, the UE 120 may perform channel estimation and may report channel estimation parameters to the BS 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The BS 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the BS 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the BS 110 may then calculate a position of the UE 120 based on the RSTD measurements reported by the UE 120.

An SRS may carry information used for uplink channel estimation, which may be used for scheduling, link adaptation, precoder selection, or beam management, among other examples. The BS 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The BS 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

In some communications systems, a UE may receive a group-common downlink control information (DCI) message that includes a preemption indication. The preemption indication may indicate preemption of a downlink transmission on a particular set of time resources and frequency resources, thereby enabling use of the particular set of time resources and frequency resource for, for example, ultra-reliable low latency communication (URLLC) services. Similarly, a UE may receive a cancellation indication that is associated with cancelling an uplink transmission on a particular set of time resources and frequency resources (e.g., to enable use of the particular set of time resources and frequency resources for, for example, URLLC services).

However, preemption of a downlink transmission and/or cancellation of an uplink transmission may reduce reliability for non-URLLC service UEs, such as for enhanced mobile broadband (eMBB) service UEs. Moreover, preemption of a downlink transmission and/or cancellation of an uplink transmission may degrade coverage for an eMBB service UE. For example, when the cancellation indication causes the UE to drop one or more physical uplink shared channel (PUSCH) repetitions, a result may be less than a threshold level of coverage for the UE on an uplink. Subsequent signaling, such as a grant, may be used to provide new resources to replace preempted or cancelled resources. However, use of subsequent signaling to provide a grant may result in excessive signaling overhead.

Some aspects described herein enable dynamic signaling of alternative resources for dropped PUSCH repetitions without excessive signaling overhead. For example, the UE may be configured with scheduled alternate resources and may, based at least in part on information included in the cancellation indication, dynamically select one or more alternate resources from the scheduled alternate resources for use in transmitting a PUSCH repetition. In this way, the UE may maintain a threshold level of reliability and/or coverage without using subsequent signaling (e.g., after the cancellation indication) to dynamically indicate resources that are to be used.

Figure 4:
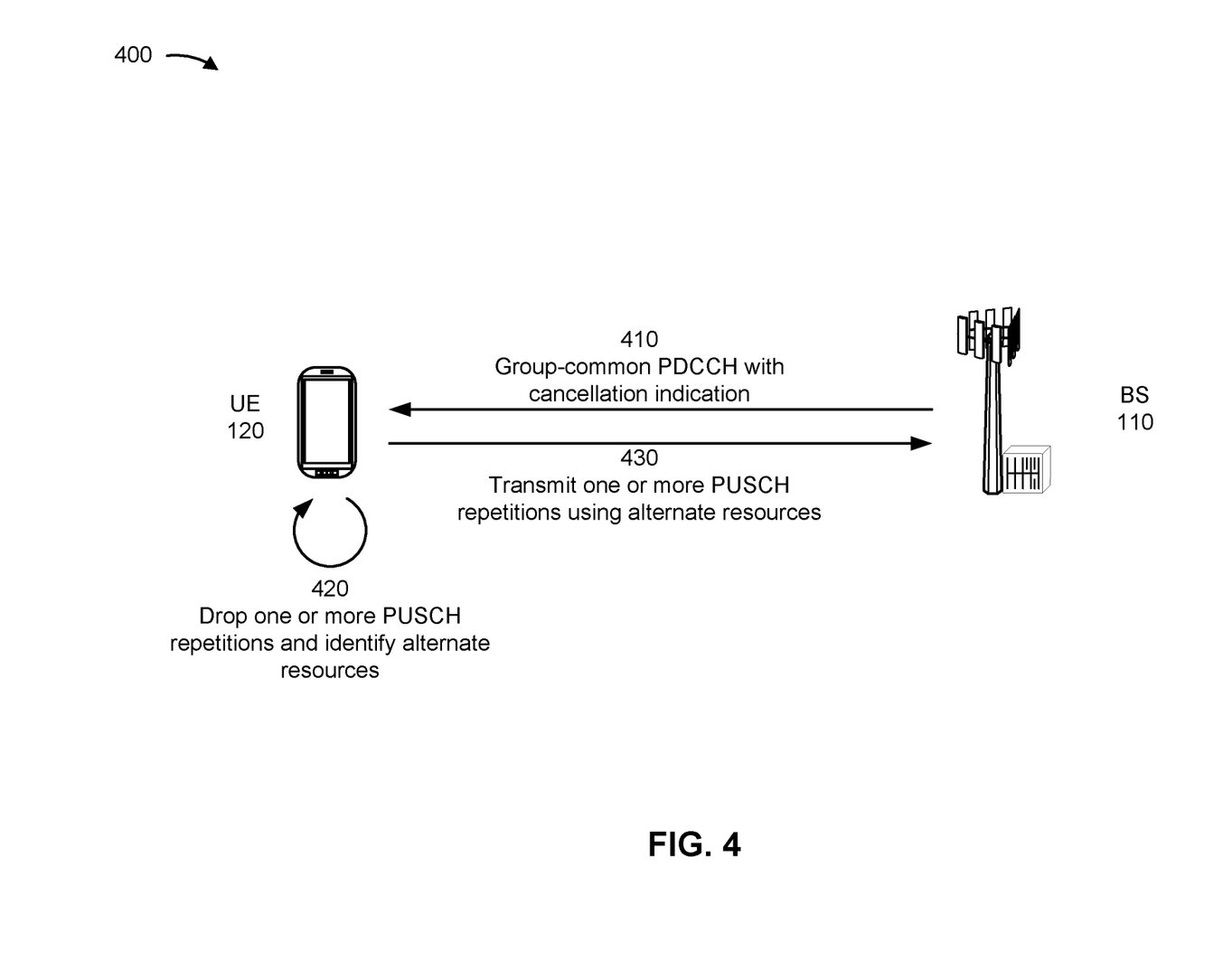
FIG. 4 is a diagram illustrating an example associated with resource identification after cancellation indication receipt, in accordance with the present disclosure.

FIG. 4 is a diagram illustrating an example 400 of resource identification after cancellation indication receipt, in accordance with various aspects of the present disclosure. As shown in FIG. 4, example 400 includes a BS 110 and a UE 120.

As further shown in FIG. 4, and by reference number 410, UE 120 may receive a downlink communication that includes a cancellation indication. For example, UE 120 may receive a group-common physical downlink control channel (PDCCH) that includes the cancellation indication. In some aspects, the cancellation indication is included in a DCI of the group-common PDCCH. In some aspects, the cancellation indication is based on an implicit indication of a preemption of a downlink transmission. For example, based at least in part on a preemption indication, UE 120 may receive a cancellation indication to cancel scheduling uplink resources.

As further shown in FIG. 4, and by reference number 420, UE 120 may drop one or more PUSCH repetitions and identify alternate resources. For example, UE 120 may drop a PUSCH repetition from transmission in a first scheduled resource identified by the cancellation indication and may identify one or more alternate resources for transmitting one or more other PUSCH repetitions. In some aspects, UE 120 may identify the alternate resources based at least in part on an implicit indicator in the cancellation indication. For example, the cancellation indication may include an indicator of a resource block frequency and UE 120 may dynamically select the alternate resources, from a plurality of pre-configured possible resources (e.g., configured using static signaling), based at least in part on the indicated resource block frequency.

In some aspects, UE 120 may determine whether to identify alternate resources based at least in part on an indicator in the cancellation indication. For example, UE 120 may determine that a particular value for a flag in the cancellation indication indicates that UE 120 is to identify alternate resources (e.g., and that another value for the flag indicates that UE 120 is not to identify alternate resources). Additionally, or alternatively, UE 120 may determine whether to identify alternate resources based at least in part on a configuration or characteristic of the cancellation indication. For example, when the cancellation indication is applied to less than a whole bandwidth part, UE 120 may identify alternate resources. In contrast, when the cancellation indication is applied to the whole bandwidth part, UE 120 may forgo identifying alternate resources. Additionally, or alternatively, UE 120 may determine whether to identify alternate resources based at least in part on a quantity of dropped repetitions and/or a quantity of scheduled repetitions of a PUSCH. For example, UE 120 may determine to identify alternate resources when more than a threshold percentage of repetitions or more than a threshold absolute quantity of repetitions are cancelled by the cancellation indication. In this case, when the threshold percentage and/or the threshold absolute quantity are not satisfied, UE 120 may forgo identifying alternate resources.

In some aspects, UE 120 may identify the alternate resources in connection with a configured grant. For example, UE 120 may determine, based at least in part on the cancellation indication, to use a configured grant (e.g., indicated in a radio resource control (RRC) configuration of a search space associated with a DCI that conveys the cancellation indication) to retransmit a repetition of a PUSCH.

As further shown in FIG. 4, and by reference number 430, UE 120 may transmit one or more PUSCH repetitions using the identified alternate resources. For example, UE 120 may transmit a PUSCH repetition using a resource identified as a backup to a dropped resource indicated by the cancellation indication. In this way, UE 120 ensures a threshold level of reliability and/or coverage for, for example, non-URLLC service when a cancellation indication is received.

As indicated above, FIG. 4 is provided as an example. Other examples may differ from what is described with respect to FIG. 4.

Figure 5:
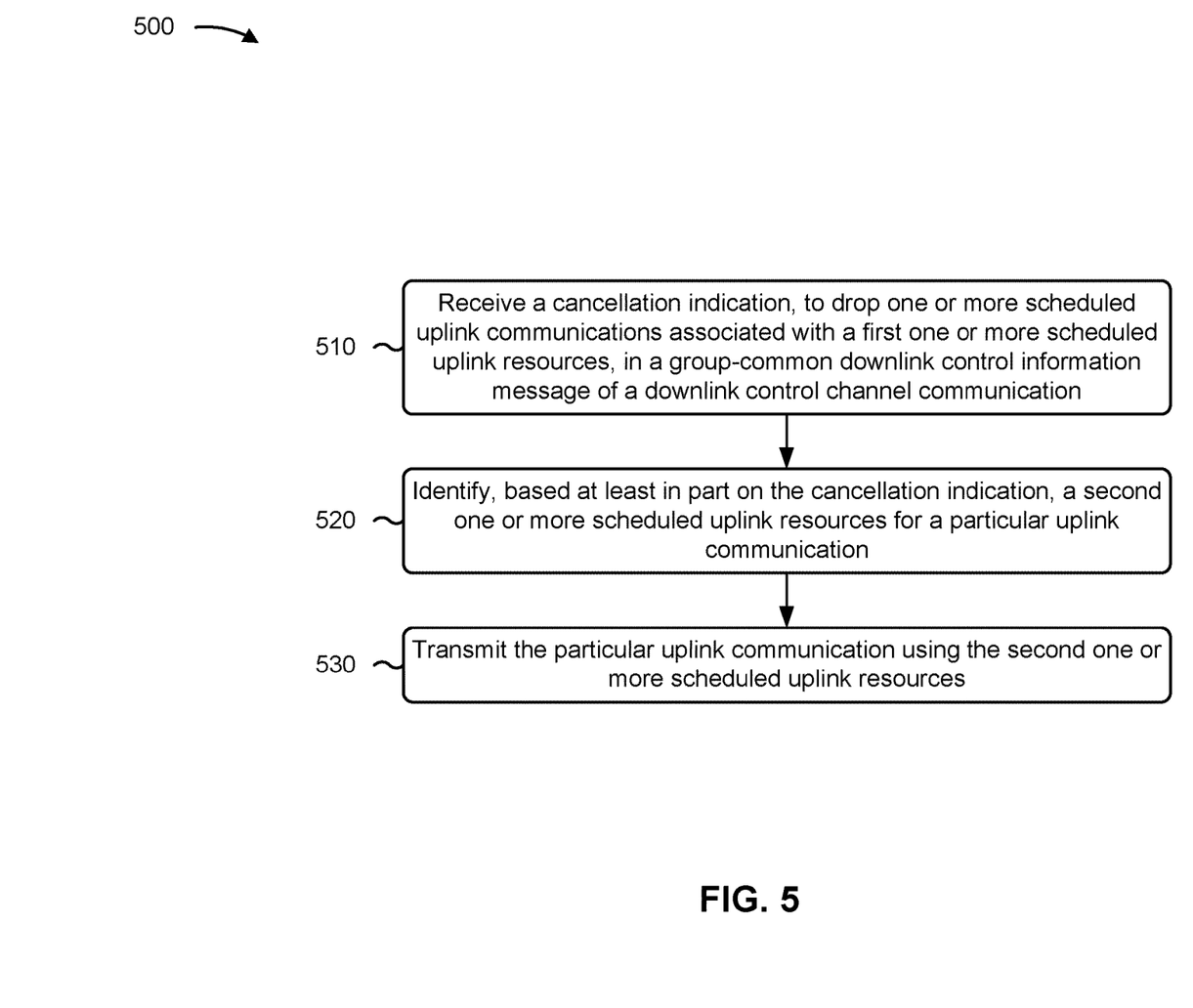
FIG. 5 is a diagram illustrating an example process associated with resource identification after cancellation indication receipt, in accordance with the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with resource identification after cancellation indication receipt.

As shown in FIG. 5, in some aspects, process 500 may include receiving a cancellation indication, to drop one or more scheduled uplink communications associated with a first one or more scheduled uplink resources, in a group-common downlink control information message of a downlink control channel communication (block 510). For example, the UE (e.g., using receive processor 258, transmit processor 264, controller/processor 280, memory 282, and/or the like) may receive a cancellation indication, to drop one or more scheduled uplink communications associated with a first one or more scheduled uplink resources, in a group-common downlink control information message of a downlink control channel communication, as described above.

As further shown in FIG. 5, in some aspects, process 500 may include identifying, based at least in part on the cancellation indication, a second one or more scheduled uplink resources for a particular uplink communication (block 520). For example, the UE (e.g., using receive processor 258, transmit processor 264, controller/processor 280, memory 282, and/or the like) may identify, based at least in part on the cancellation indication, a second one or more scheduled uplink resources for a particular uplink communication, as described above.

As further shown in FIG. 5, in some aspects, process 500 may include transmitting the particular uplink communication using the second one or more scheduled uplink resources (block 530). For example, the UE (e.g., using receive processor 258, transmit processor 264, controller/processor 280, memory 282, and/or the like) may transmit the particular uplink communication using the second one or more scheduled uplink resources, as described above.

Process 500 may include additional aspects, such as any single aspect or any combination of aspects described below and/or in connection with one or more other processes described elsewhere herein.

In a first aspect, the cancellation indication includes an implicit indicator, and identifying the second one or more scheduled uplink resources includes selecting the one or more scheduled uplink resources from a plurality of possible scheduled uplink resources based at least in part on the implicit indicator.

In a second aspect, alone or in combination with the first aspect, the implicit indicator is an indicator of a resource block frequency in the cancellation indication.

In a third aspect, alone or in combination with one or more of the first and second aspects, the cancellation indication includes an indicator set to a particular value, and identifying the second one or more scheduled uplink resources includes identifying the second one or more scheduled uplink resources based at least in part on the indicator being set to the particular value.

In a fourth aspect, alone or in combination with one or more of the first through third aspects, identifying the second one or more scheduled uplink resources includes identifying the second one or more scheduled uplink resources based at least in part on a configuration of the cancellation indication.

In a fifth aspect, alone or in combination with one or more of the first through fourth aspects, identifying the second one or more scheduled uplink resources includes identifying the second one or more scheduled uplink resources based at least in part on a configured grant identified in connection with the cancellation indication.

In a sixth aspect, alone or in combination with one or more of the first through fifth aspects, the configured grant is identified in a radio resource control configuration of a search space associated with the group-common downlink control information message.

In a seventh aspect, alone or in combination with one or more of the first through sixth aspects, the one or more scheduled uplink communications are a first one or more repetitions of a physical uplink shared channel communication and the particular uplink communication is a second repetition of the physical uplink shared channel communication.

In an eighth aspect, alone or in combination with one or more of the first through seventh aspects, identifying the second one or more scheduled uplink resources comprises: identifying the second one or more scheduled uplink resources based at least in part on at least one of: a quantity of uplink communications dropped in connection with the cancellation indication, or a total quantity of uplink communications for which at least one uplink communication is dropped in connection with the cancellation indication.

In a ninth aspect, alone or in combination with one or more of the first through eighth aspects, the cancellation indication is based at least in part on a preemption indication.

In a tenth aspect, alone or in combination with one or more of the first through ninth aspects, the cancellation indication is based at least in part on an implicit indication of a preemption of a downlink transmission.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
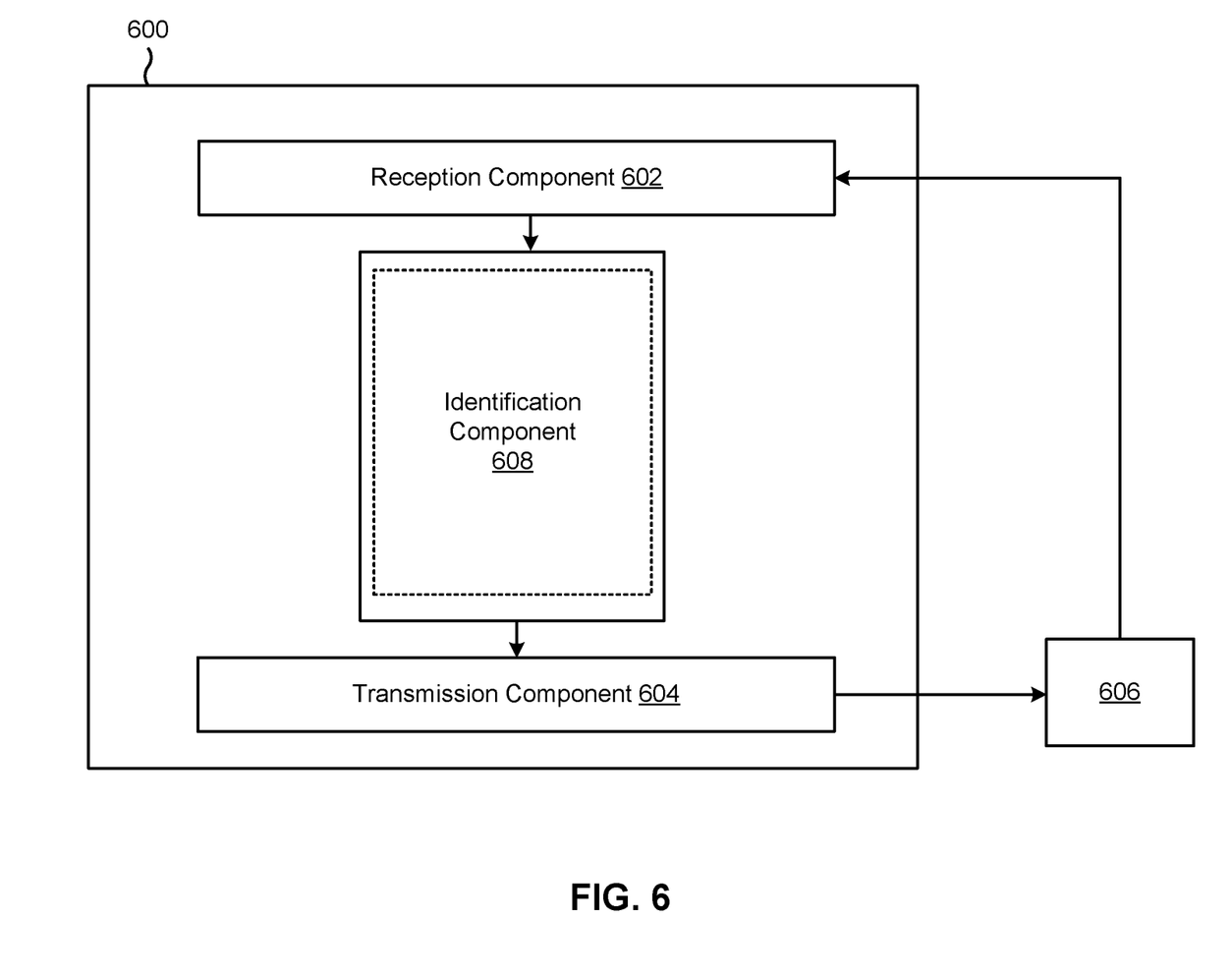
FIG. 6 is a block diagram of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of an identification component 608, among other examples.

In some aspects, the apparatus 600 may be configured to perform one or more operations described herein in connection with FIGS. 4-5. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

In some aspects, the reception component 602 may receive a cancellation indication, to drop one or more scheduled uplink communications associated with a first one or more scheduled uplink resources, in a group-common downlink control information message of a downlink control channel communication. In some aspects, the identification component 608 may identify, based at least in part on the cancellation indication, a second one or more scheduled uplink resources for a particular uplink communication. In some aspects, the transmission component 604 may transmit the particular uplink communication using the second one or more scheduled uplink resources.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: receiving a cancellation indication, to drop one or more scheduled uplink communications associated with a first one or more scheduled uplink resources, in a group-common downlink control information message of a downlink control channel communication; identifying, based at least in part on the cancellation indication, a second one or more scheduled uplink resources for a particular uplink communication; and transmitting the particular uplink communication using the second one or more scheduled uplink resources.

Aspect 2: The method of Aspect 1, wherein the cancellation indication is based at least in part on a preemption indication.

Aspect 3: The method of Aspect 2, wherein the cancellation indication is based at least in part on an implicit indication of a preemption of a downlink transmission.

Aspect 4: The method of any one of Aspects 1 to 3, wherein the cancellation indication includes an implicit indicator; and wherein identifying the second one or more scheduled uplink resources comprises: selecting the one or more scheduled uplink resources from a plurality of possible scheduled uplink resources based at least in part on the implicit indicator.

Aspect 5: The method of Aspect 4, wherein the implicit indicator is an indicator of a resource block frequency in the cancellation indication.

Aspect 6: The method of any one of Aspects 1 to 5, wherein the cancellation indication includes an indicator set to a particular value; and wherein identifying the second one or more scheduled uplink resources comprises: identifying the second one or more scheduled uplink resources based at least in part on the indicator being set to the particular value.

Aspect 7: The method of any one of Aspects 1 to 6, wherein identifying the second one or more scheduled uplink resources comprises: identifying the second one or more scheduled uplink resources based at least in part on a configuration of the cancellation indication.

Aspect 8: The method of any one of Aspects 1 to 7, wherein identifying the second one or more scheduled uplink resources comprises: identifying the second one or more scheduled uplink resources based at least in part on a configured grant identified in connection with the cancellation indication.

Aspect 9: The method of Aspect 8, wherein the configured grant is identified in a radio resource control configuration of a search space associated with the group-common downlink control information message.

Aspect 10: The method of any one of Aspects 1 to 9, wherein the one or more scheduled uplink communications are a first one or more repetitions of a physical uplink shared channel communication and the particular uplink communication is a second repetition of the physical uplink shared channel communication.

Aspect 11: The method of any one of Aspects 1 to 10, wherein identifying the second one or more scheduled uplink resources comprises: identifying the second one or more scheduled uplink resources based at least in part on at least one of: a quantity of uplink communications dropped in connection with the cancellation indication, or a total quantity of uplink communications for which at least one uplink communication is dropped in connection with the cancellation indication.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive a cancellation indication, to drop one or more scheduled uplink communications associated with a first one or more scheduled uplink resources, in a group-common downlink control information message of a downlink control channel communication, wherein the one or more scheduled uplink communications are a first one or more repetitions of a physical uplink shared channel communication, and wherein the cancellation indication comprises an indicator having a value that indicates the UE is to identify alternate resources for a particular uplink communication;
        perform, based at least in part on the indicator in the cancellation indication and a quantity of uplink communications, dropped in connection with the cancellation indication, satisfying a threshold, a dynamic selection of a second one or more scheduled uplink resources for the particular uplink communication, wherein the particular uplink communication is a second repetition of the physical uplink shared channel communication; and
        transmit the particular uplink communication using the second one or more scheduled uplink resources.

2. The UE of claim 1, wherein the cancellation indication is based at least in part on a preemption indication.

3. The UE of claim 2, wherein the cancellation indication is based at least in part on an implicit indication of a preemption of a downlink transmission.

4. The UE of claim 1, wherein the indicator in the cancellation indication includes an implicit indicator; and
wherein the one or more processors, to perform the dynamic selection of the second one or more scheduled uplink resources, are configured to:
select the one or more scheduled uplink resources from a plurality of possible scheduled uplink resources based at least in part on the implicit indicator.

5. The UE of claim 4, wherein the implicit indicator is an indicator of a resource block frequency in the cancellation indication.

6. The UE of claim 1,
wherein the one or more processors, to perform the dynamic selection of the second one or more scheduled uplink resources, are configured to:
identify the second one or more scheduled uplink resources based at least in part on the indicator having the value.

7. The UE of claim 1, wherein the one or more processors, to perform the dynamic selection of the second one or more scheduled uplink resources, are configured to:
identify the second one or more scheduled uplink resources based at least in part on a configuration of the cancellation indication.

8. The UE of claim 1, wherein the one or more processors, to perform the dynamic selection of the second one or more scheduled uplink resources, are configured to:
identify the second one or more scheduled uplink resources based at least in part on a configured grant identified in connection with the indicator in the cancellation indication.

9. The UE of claim 8, wherein the configured grant is identified in a radio resource control configuration of a search space associated with the group-common downlink control information message.

10. A method of wireless communication performed by a user equipment (UE), comprising:
receiving a cancellation indication, to drop one or more scheduled uplink communications associated with a first one or more scheduled uplink resources, in a group-common downlink control information message of a downlink control channel communication, wherein the one or more scheduled uplink communications are a first one or more repetitions of a physical uplink shared channel communication, and wherein the cancellation indication comprises an indicator having a value that indicates the UE is to identify alternate resources for a particular uplink communication;
performing, based at least in part on the indicator in the cancellation indication and a quantity of uplink communications, dropped in connection with the cancellation indication, satisfying a threshold, a dynamic selection of a second one or more scheduled uplink resources for the particular uplink communication, wherein the particular uplink communication is a second repetition of the physical uplink shared channel communication; and
transmitting the particular uplink communication using the second one or more scheduled uplink resources.

11. The method of claim 10, wherein the cancellation indication is based at least in part on a preemption indication.

12. The method of claim 11, wherein the cancellation indication is based at least in part on an implicit indication of a preemption of a downlink transmission.

13. The method of claim 10, wherein the indicator in the cancellation indication includes an implicit indicator; and wherein performing the dynamic selection of the second one or more scheduled uplink resources comprises:
selecting the one or more scheduled uplink resources from a plurality of possible scheduled uplink resources based at least in part on the implicit indicator.

14. The method of claim 13, wherein the implicit indicator is an indicator of a resource block frequency in the cancellation indication.

15. The method of claim 10,
wherein performing the dynamic selection of the second one or more scheduled uplink resources comprises:
identifying the second one or more scheduled uplink resources based at least in part on the indicator having the value.

16. The method of claim 10, wherein performing the dynamic selection of the second one or more scheduled uplink resources comprises:
identifying the second one or more scheduled uplink resources based at least in part on a configuration of the cancellation indication.

17. The method of claim 10, wherein performing the dynamic selection of the second one or more scheduled uplink resources comprises:
identifying the second one or more scheduled uplink resources based at least in part on a configured grant identified in connection with the indicator in the cancellation indication.

18. The method of claim 17, wherein the configured grant is identified in a radio resource control configuration of a search space associated with the group-common downlink control information message.

19. A non-transitory computer-readable medium storing a set of instructions for wireless communication, the set of instructions comprising:
one or more instructions that, when executed by one or more processors of a user equipment (UE), cause the UE to:
receive a cancellation indication, to drop one or more scheduled uplink communications associated with a first one or more scheduled uplink resources, in a group-common downlink control information message of a downlink control channel communication, wherein the one or more scheduled uplink communications are a first one or more repetitions of a physical uplink shared channel communication, and wherein the cancellation indication comprises an indicator having a value that indicates the UE is to identify alternate resources for a particular uplink communication;
perform, based at least in part on the indicator in the cancellation indication and a quantity of uplink communications, dropped in connection with the cancellation indication, satisfying a threshold, a dynamic selection of a second one or more scheduled uplink resources for the particular uplink communication, wherein the particular uplink communication is a second repetition of the physical uplink shared channel communication; and
transmit the particular uplink communication using the second one or more scheduled uplink resources.

20. The non-transitory computer-readable medium of claim 19, wherein the cancellation indication is based at least in part on a preemption indication.

21. The non-transitory computer-readable medium of claim 20, wherein the cancellation indication is based at least in part on an implicit indication of a preemption of a downlink transmission.

22. The non-transitory computer-readable medium of claim 19, wherein the indicator in the cancellation indication includes an implicit indicator; and
wherein the one or more instructions, that cause the UE to perform the dynamic selection of the second one or more scheduled uplink resources, cause the UE to:
select the one or more scheduled uplink resources from a plurality of possible scheduled uplink resources based at least in part on the implicit indicator.

23. An apparatus for wireless communication, comprising:
means for receiving a cancellation indication, to drop one or more scheduled uplink communications associated with a first one or more scheduled uplink resources, in a group-common downlink control information message of a downlink control channel communication, wherein the one or more scheduled uplink communications are a first one or more repetitions of a physical uplink shared channel communication, and wherein the cancellation indication comprises an indicator having a value that indicates the apparatus is to identify alternate resources for a particular uplink communication;
means for performing, based at least in part on the indicator in the cancellation indication and a quantity of uplink communications, dropped in connection with the cancellation indication, satisfying a threshold, a dynamic selection of a second one or more scheduled uplink resources for the particular uplink communication, wherein the particular uplink communication is a second repetition of the physical uplink shared channel communication; and
means for transmitting the particular uplink communication using the second one or more scheduled uplink resources.

24. The apparatus of claim 23, wherein the cancellation indication is based at least in part on a preemption indication.

25. The apparatus of claim 24, wherein the cancellation indication is based at least in part on an implicit indication of a preemption of a downlink transmission.

26. The apparatus of claim 23, wherein the indicator in the cancellation indication includes an implicit indicator; and
wherein the means for performing the dynamic selection of the second one or more scheduled uplink resources comprises:
means for selecting the one or more scheduled uplink resources from a plurality of possible scheduled uplink resources based at least in part on the implicit indicator.

27. The non-transitory computer-readable medium of claim 22, wherein the implicit indicator is an indicator of a resource block frequency in the cancellation indication.

28. The apparatus of claim 26, wherein the implicit indicator is an indicator of a resource block frequency in the cancellation indication.

29. The UE of claim 1, wherein the threshold comprises one of:
a threshold absolute quantity of uplink communications dropped in connection with the cancellation indication, or
a threshold percentage of the one or more scheduled uplink communications.

30. The method of claim 10, wherein the threshold comprises one of:
a threshold absolute quantity of uplink communications dropped in connection with the cancellation indication, or
a threshold percentage of the one or more scheduled uplink communications.

* * * * *